Figures 1, 2:
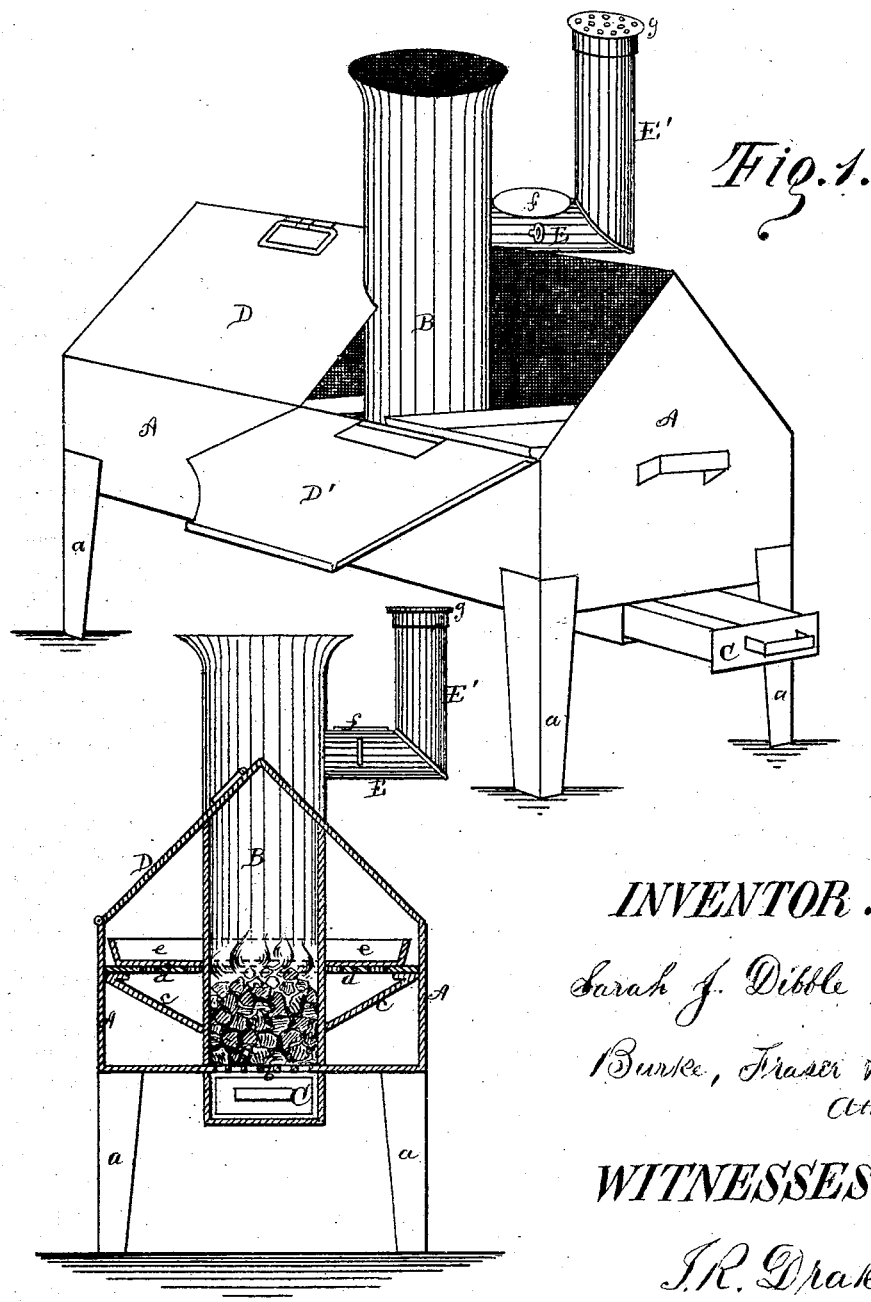

SARAH J. DIBBLE.
Portable Stoves.

No. 145,491. Patented Dec. 16, 1873.

INVENTOR:
Sarah J. Dibble, by
Burke, Fraser & Co.
Attorneys

WITNESSES:
J. R. Drake.
C. Hirsekorn.

UNITED STATES PATENT OFFICE.

SARAH J. DIBBLE, OF LOCKPORT, NEW YORK.

IMPROVEMENT IN PORTABLE STOVES.

Specification forming part of Letters Patent No. 145,491, dated December 16, 1873; application filed September 10, 1873.

*To all whom it may concern:*

Be it known that I, SARAH JANE DIBBLE, of Lockport, in the county of Niagara and State of New York, have invented certain Improvements in Portable Stoves, of which the following is a specification:

The invention relates to bakers or small portable stoves, made of tin or sheet metal, which contain the fire, and are intended, more especially, for summer use. The invention consists in the general construction of the same, as hereinafter specified.

In the drawings, Figure 1 is a perspective, and Fig. 2 a vertical cross-section through the center.

A represents the casing of the stove, made of tin or suitable sheet metal, or both, and mounted on legs $a$ $a$. B is a combined pipe and fire-pot set in the center, which will be of sheet-iron, and having a grate, $b$, at the bottom, on which the coal, &c., rests. Charcoal will be the fuel best adapted for quick combustion and intense heat without smoke; and two quarts of this coal will be sufficient for baking or cooking a dinner, or baking bread and making tea. The fumes of the charcoal can be easily conducted off by a supplementary pipe leading to a stove-pipe hole or chimney, but with an open room in summer there will be no difficulty from this. Underneath the grate is a drawer, C, or combined ash-pan and draft-regulator. By merely drawing it out more or less, the necessary draft is given to the fire. Inside the stove is a false bottom or plate, $c$ $c$, inclined from the side to the foot of the pipe B. This is for the important purpose of reflecting or throwing up the heat radiated from the pipe itself. In a straight line across the stove, and above the plate $c$, are set the regular broilers or grates $d$ $d$, on which the food to be cooked will be set; and on these bake-pans $e$, for bread, &c., will also stand, as shown. One side of this stove is made closed, but the upper half of the other side, or front, is arranged with doors D D′, which swing downward, so as to allow easy access inside. A supplementary pipe or heater, E, will be set into the main pipe B above the stove, with a disk, $f$, attached to warm plates, &c.; and there will be an elbow, E′, with a perforated plate, $g$, set on top, for the purpose of heating water in a tea-kettle, &c. This can be removed and a closed top put on to confine all the heat to the stove, if desired.

My device is a combined portable, summer, charcoal stove, which will broil, bake, roast, fry, &c., heat dishes, keep plates warm, heat water, boil tea or coffee, heat flat-irons, &c., with the smallest amount of coal, and, consequently, at a very slight cost. It is not intended for a permanent heating-stove, but for use in warm weather, to cook meals, do ironing, &c., and will be found entirely practical and very economical.

I claim—

1. The combined pipe and fire chamber, arranged within the center of the casing A, for heating the baking-chamber, in combination with the supplemental pipe E, for heating kettles, dishes, and other articles, substantially as and for the purpose specified.

2. A portable summer stove, consisting of the sheet-metal body A, having the central grate $b$, central combined pipe and fire-chamber B, perforated plates $d$, supplemental pipe E, and elbow E′, all constructed and arranged substantially as and for the purpose specified.

In witness whereof I have hereunto signed my name in the presence of two subscribing witnesses.

SARAH JANE DIBBLE.

Witnesses:
J. R. DRAKE,
T. H. PARSONS.